United States Patent Office 3,539,590
Patented Nov. 10, 1970

3,539,590
SUBSTITUTED 3,3,6,6 - TETRAMETHYL-1,8 - DIKETO - 9 - (2 - HYDROXYPHENYL) OCTAHYDROXANTHENES
Marvin L. Oftedahl, Crestwood, Mo., assignor to Monsanto Company, St. Louis, Mo., a corporation of Delaware
No Drawing. Continuation-in-part of application Ser. No. 526,026, Feb. 9, 1966. This application May 20, 1968, Ser. No. 730,591
Int. Cl. C07d 7/42
U.S. Cl. 260—335
9 Claims

ABSTRACT OF THE DISCLOSURE

This disclosure covers certain 3,3,6,6-tetramethyl-1,8-diketo - 9 - (2-hydroxyphenyl) octahydroxanthenes which contain two or three additional substituents on the phenyl ring. Such compounds display utility in the control of certain microbiological organisms.

---

This application is a continuation-in-part of my copending application Ser. No. 526,026, filed Feb. 9, 1966, and now abandoned.

This invention relates to a novel class of substituted phenyl octahydroxanthenes. More particularly, this invention is concerned with a class of new organic compounds which are 3,3,6,6-tetramethyl-1,8-diketo-9-(2-hydroxy, halo, trifluoromethyl, or nitrophenyl) octahydroxanthenes.

The novel compounds of this invention have the general formula

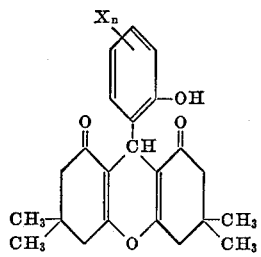

where X is selected from a group consisting of chlorine, bromine, $CF_3$ and $NO_2$, and $n$ is 2 or 3.

This class of compounds can be prepared by the cyclization of a substituted benzylidene cyclohexanedione. Such starting materials are themselves novel, and illustrative members of this novel group are disclosed in copending application Ser. No. 526,051, filed Feb. 9, 1966, now Pat. No. 3,358,031.

A typical illustrative reaction for preparing a compound of this invention is shown by the following equation:

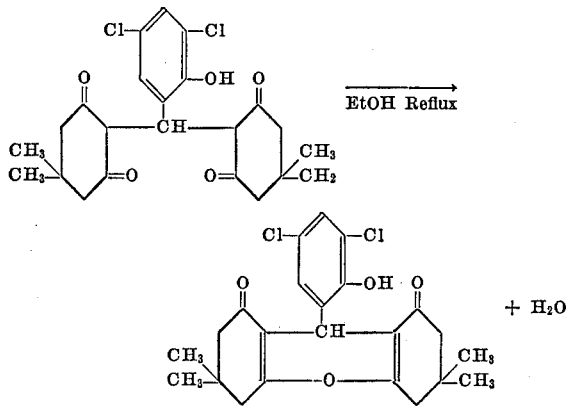

To carry out the above reaction, 2 grams of 2,2'-(3,5-dichloro-2-hydroxybenzylidene) bis(5,5-dimethyl-1,3-cyclohexanedione) is heated at reflux in 20 ml. of ethanol containing 0.5 ml. concentrated hydrochloric acid for 10 minutes. The solution is cooled to room temperature, water is added to the cloud point, and, after chilling, the xanthene is obtained by filtration. The product may be recrystallized from methanol if desired.

As should be readily apparent, other and different compounds of this invention are prepared by the simple cyclization procedure set forth above. By way of further example, where the starting material is 2,2'-(3,4,5-trichloro-2-hydroxybenzylidene) bis(5,5-dimethyl-1,3-cyclohexanedione), the cyclized product is 3,3,6,6-tetramethyl-1,8-diketo-9-(3,4,5-trichloro - 2 - hydroxyphenyl) octahydroxanthene. Where the benzylidene starting material contains nitro groups at the 3 and 5 positions in addition to the 2-hydroxy substituent, the cyclized product is 3,3,6,6-tetramethyl - 1,8 - diketo-9-(3,5-dinitro-2-hydroxyphenyl) octahydroxanthene. Likewise, starting with a material having trifluoromethyl substituents at the 3 and 5 positions of the benzylidene group plus the aforesaid 2-hydroxy substituent, the cyclized product is 3,3,6,6-tetramethyl - 1,8 - diketo - 9 - [3,5 - di(trifluoromethyl) - 2 - hydroxyphenyl] octahydroxanthene. Still further, where the starting material contains a bromine substituent at the 3 and 5 positions, and also the 2-hydroxy substituent, the cyclized product is 3,3,6,6-tetramethyl-1,8-diketo-9-(3,5-dibromo-2-hydroxyphenyl) octahydroxanthene.

The products of the present invention are adapted for use in the control of microbiological organisms. In a representative test, 3,3,6,6-tetramethyl-1,8-diketo-9-(3,5-dichloro-2-hydroxyphenyl) octahydroxanthene is found to control the growth of Staphylococcus aureus at a dilution in excess of one part per million. The corresponding bromo, trifluoro and nitro substituted analogs of this invention are also found to demonstarte control of this representative species of gram positive bacteria. As opposed to this, the unsubstituted parent compound 3,3,6,6-tetramethyl-1,8-diketo-9-(o - hydroxyphenyl) octahydroxanthene was found to be completely ineffective in controlling the growth of the above bacteria, even at a concentration more than 100 times greater than that noted for the compound of this invention.

The above examples are set forth solely for the purpose of illustration, and are not to be construed as limiting the scope of the present invention. It is to be understood that modifications and variations of the invention, obvious to those skilled in the art, may be made without departing from the spirit and scope of said invention.

The embodiments of the invention in which an exclusive property or privilege is claimed are defined as follows:

1. A compound of the formula:

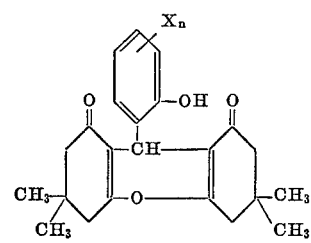

where X is selected from a group consisting of chlorine or bromine at the 3,4 and/or 5 positions of the phenol moiety and $CF_3$ and $NO_2$ at the 3 and 5 positions of the phenol moiety, and $n$ is an integer from 2 to 3.

2. A compound as defined in claim 1 wherein X is chlorine.

3. A compound as defined in claim 1 wherein X is bromine.

4. A compound as defined in claim 1 wherein X is $NO_2$.

5. A compound as defined in claim 1 wherein X is $CF_3$.

6. A compound as defined in claim 1 wherein the compound is 3,3,6,6-tetramethyl-1,8-diketo-9-(3,5-dichloro-2-hydroxyphenyl) octahydroxanthene.

7. A compound as defined in claim 1 wherein the compound is 3,3,6,6-tetramethyl-1,8-diketo-9-(3,4,5-trichloro-2-hydroxyphenyl) octahydroxanthene.

8. A compound as defined in claim 1 wherein the compound is 3,3,6,6-tetramethyl-1,8-diketo-9-(3,5-dinitro-2-hydroxyphenyl) octahydroxanthene.

9. A compound as defined in claim 1 wherein the compound is 3,3,6,6-tetramethyl-1,8-diketo-9-(3,5-ditrifluoromethyl-2-hydroxyphenyl) octahydroxanthene.

References Cited

UNITED STATES PATENTS 3,414,587  12/1968  Lehr et al. _____ 260—335

OTHER REFERENCES

Chemical Abstracts, vol. 33, p. 1746 (1939).

NORMA S. MILESTONE, Primary Examiner

U.S. Cl. X.R.

260—999